No. 785,839. Patented March 28, 1905.

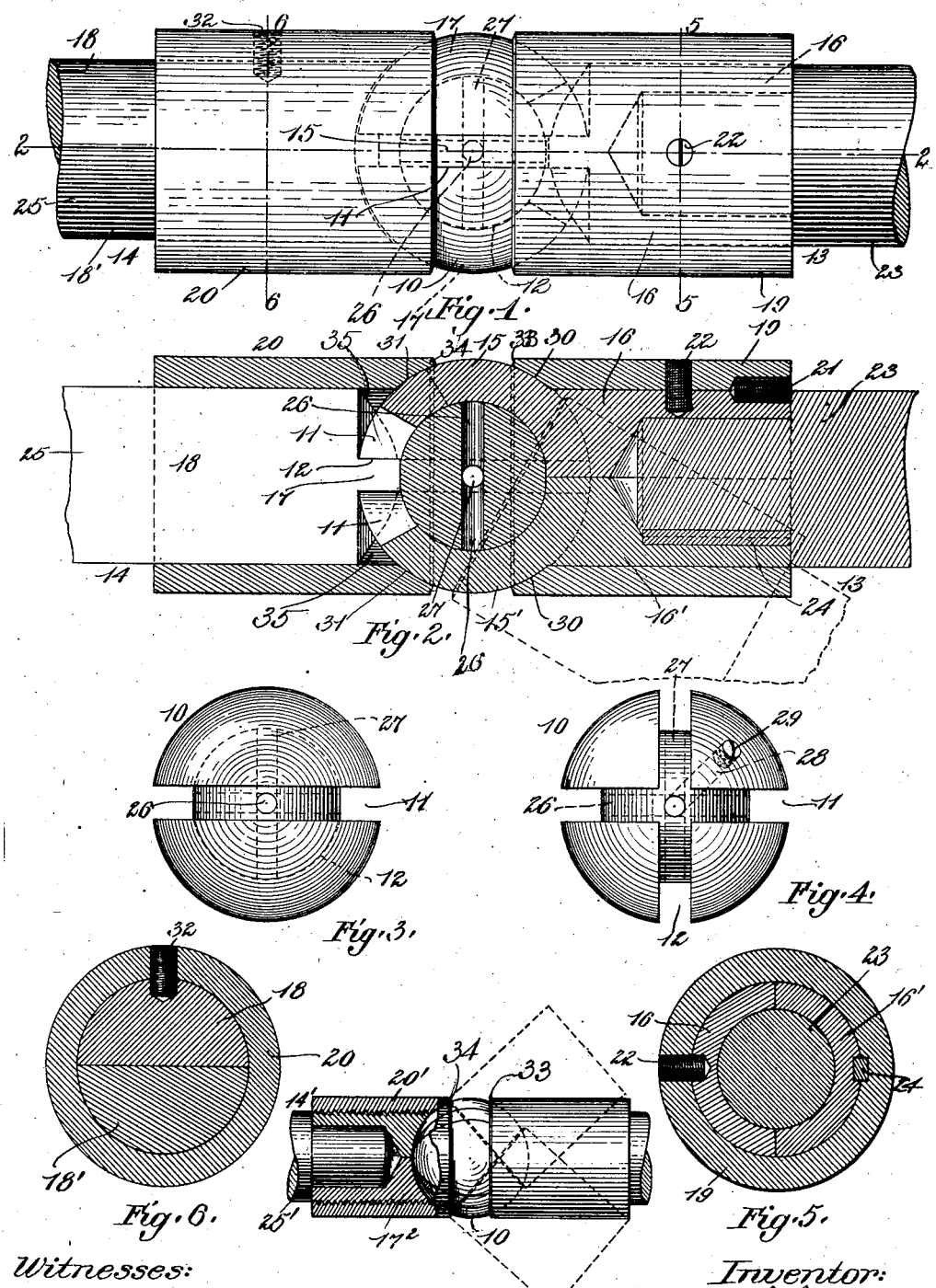

UNITED STATES PATENT OFFICE.

GEORGE W. TONEY, OF WALTHAM, MASSACHUSETTS, ASSIGNOR TO FRANK BURGESS, OF QUINCY, MASSACHUSETTS.

UNIVERSAL JOINT.

SPECIFICATION forming part of Letters Patent No. 785,839, dated March 28, 1905.

Application filed July 11, 1904. Serial No. 216,008.

*To all whom it may concern:*

Be it known that I, GEORGE W. TONEY, a citizen of the United States, residing at Waltham, in the county of Middlesex and State of Massachusetts, have invented new and useful Improvements in Universal Joints, of which the following is a specification.

The object of this invention is to provide a strong, simple, and durable universal joint which shall present a large bearing-surface in proportion to its diameter and which shall also present a neat and finished appearance, free from projecting arms or parts which are liable to catch the clothing of operators, resulting in accidents.

The invention consists in the combination and arrangement of parts set forth in the following specification, and particularly pointed out in the claims thereof.

Referring to the drawings, Figure 1 is a side elevation of my improved universal joint with a shaft fast to each of the opposite ends thereof, respectively, and broken away to save space in the drawings. Fig. 2 is a section, partly in elevation, taken on line 2 2 of Fig. 1. Fig. 3 is a side elevation of the ball. Fig. 4 is another side elevation of the ball as viewed from the right of Fig. 3. Fig. 5 is a section taken on line 5 5 of Fig. 1 looking toward the left. Fig. 6 is a section taken on line 6 6 of Fig. 1 looking toward the left in said figure. Fig. 7 is a plan view of my imimproved joint, partly in section, illustrating different relative positions of the parts in dotted lines.

Like numerals refer to like parts throughout the several views of the drawings.

In the drawings, 10 is a ball provided in its periphery with two annular grooves 11 and 12 at right angles to each other. Two yokes 13 and 14 are provided, the yoke 13 consisting of an annular ring portion in two parts 15 and 15', located in the groove 11 and integral, respectively, with shank portions 16 and 16'. The shank portions 16 and 16' form together a cylindrical shank. The yoke 14 is formed in two parts consisting of ring portions 17 17', located in the groove 12 and integral, respectively, with shank portions 18 and 18', said shank portions forming as a whole a cylindrical shank, the plane dividing the yoke 13 in two parts being at right angles to the plane dividing the yoke 14 into two parts. The yokes 13 and 14 are encircled and held together by sleeves 19 and 20, respectively. The sleeve 19 is fastened to the shank 16 by set-screws 21 and 22, and the sleeve 20 is fastened to the shank portion 18 by the set-screw 32.

The shank portions 16 and 16' have a cylindrical recess formed therein to receive the shouldered end of the shaft 23, said shaft being fastened to the shank portion 16' by a key 24.

The yoke 14 is illustrated in a different form from the yoke 13 in that the same is extended toward the left, Figs. 1 and 2, to form the shaft portion 25 instead of being made in a separate piece and keyed thereto, as illustrated at the right hand of Figs. 1 and 2 in the case of the shaft 23 and the yoke 13. It is evident that without departing from the spirit of my invention the yokes 13 and 14 may be attached to the sleeves in a variety of ways, and in Fig. 7 the sleeve 20' is shown internally screw-threaded to fit a screw-thread formed upon the exterior of the shank portion $17^2$ of the yoke 14'.

In order to secure complete lubrication for my improved joint, oil-passages 26 27 are provided, extending diametrically through the ball 10 and terminating in the grooves 11 and 12, respectively. An oil-supply passage 28 is also provided, which extends inwardly from the periphery of the ball 10 and terminates at the center of said ball at the intersection of the oil-passages 26 and 27. A screw-plug 29 is provided to close the oil-supply passage 28.

It will be seen that each of the sleeves 19 and 20 is provided with a concavo-conical end 30 and 31, respectively, which fit the periphery of the ball 10 and also the outer peripheral edge of all of the annular ring portions 15 15' and 17 17', said sleeves thus increasing the bearing-surface of the yokes upon the ball of the joint and supplying a support for the outer ends of the ring portions of said joint—as, for instance, the outer ends of the ring portions 15 15' are supported by the sleeve 20 and the outer ends of the ring portions 17 17' are supported by the sleeve 19, it being readily seen that the inner ends of the ring portions 15 15' are also supported by the sleeve 19 and the inner ends of the ring portions 17 17' are supported by the sleeve 20.

In Fig. 7 the sleeves 19 and 20 are shown in dotted lines at the extreme angle which these sleeves can in any event assume, and in this extreme position the adjacent edges of said sleeves contact one with the other, as illustrated in said Fig. 7, before the extremity of the annular ring portion 15' contacts with the annular ring portion 17, this construction resulting in imparting great strength to the joint and removing any tendency to break the ring portions 15 15' and 17 17'. It will also be noted that the edges 33 and 34 of the sleeves are chamfered, so that when the parts of the joint are in the angular positions illustrated in dotted lines, Fig. 7, said edges will form a practical bearing one against the other without tendency to rough up said edges or pry said edges apart and away from the ball and ring portions.

It will be seen and understood that by shortening or lengthening the sleeves 19 and 20, respectively, so that the space between their adjacent ends is made greater or less, said sleeves may assume positions at greater or less angles with each other, respectively. It will further be noted by reference to Fig. 2 that recesses 35 35 are provided in the interior of the sleeves between said ring portions and the shank portion—as, for instance, in Fig. 2 the recess 35 extends or is located between said ring portions 15 15' 17 17' and the shank portion 18 and interior of the sleeve 20—so that the lubricant, which has been fed into the passage 27 through the oil-passage 28, works outwardly therefrom between the periphery of the ball and the inner surface of said ring portions and into said recess, so that said recess forms a reservoir to hold a lubricant, which is transferred therefrom to the exterior of the ring portions 15 15' and 17 17' and the ball 10.

The sleeves 19 and 20 fitting accurately, as hereinbefore set forth, upon the periphery of the ball and also upon the peripheral edges of the ring portions 15 15' and 17 17 it will be seen that said sleeve portions act not only to prevent the oil from leaking out of the recess 35, but also act as dust-guards to prevent the dust from getting into the recess 35 and into the interior working surfaces between said ring portions and said ball.

Having thus described my invention, what I claim, and desire by Letters Patent to secure, is—

1. A universal joint comprising a ball provided in its periphery with two annular grooves at right angles to each other, two yokes each consisting of an annular ring portion located in said grooves, respectively, and a cylindrical shank portion; each of said shank portions divided in two parts by planes at right angles to each other, and a cylindrical sleeve encircling and fast to each of said cylindrical shanks.

2. A universal joint comprising a ball provided in its periphery with two annular grooves at right angles to each other, two yokes each consisting of an annular ring portion located in said grooves, respectively, and a cylindrical shank portion; each of said shank portions divided in two parts by planes at right angles to each other, and a cylindrical sleeve encircling and fast to each of said cylindrical shanks, said sleeves each provided with a concavo-conical end formed to fit the periphery of said ball and the outer peripheral edge of said annular ring portions.

In testimony whereof I have hereunto set my hand in presence of two subscribing witnesses.

GEORGE W. TONEY.

Witnesses:
CHARLES S. GOODING,
SYDNEY E. TAFT.